United States Patent [19]

Schleifer et al.

[11] Patent Number: 5,345,540
[45] Date of Patent: Sep. 6, 1994

[54] METHODS FOR AUTOMATICALLY PROGRAMMING SPATIAL INFORMATION IN ROBOTIC SYSTEMS

[75] Inventors: Arthur Schleifer, Palo Alto; Joseph C. Roark, Los Altos, both of Calif.; John S. Poole, Landenberg, Pa.; Gary B. Gordon, Saratoga, Calif.; Gilbert Segal, Hockessin; Philip B. Fuhrman, Wilmington, both of Del.

[73] Assignee: Hewlett-Packard Company, Palo Alto, Calif.

[21] Appl. No.: 728,926

[22] Filed: Jul. 12, 1991

[51] Int. Cl.$^5$ .............................. G05B 19/00
[52] U.S. Cl. ...................... 395/86; 395/88; 395/89; 395/93
[58] Field of Search ................ 395/86, 88, 89, 91–93, 395/95, 96

[56] References Cited

U.S. PATENT DOCUMENTS

| | | | |
|---|---|---|---|
| Re. 30,132 | 10/1979 | Irie | 318/568 |
| Re. 32,414 | 5/1987 | Hutchins et al. | 414/744 R |
| 4,001,556 | 1/1977 | Folchi et al. | 395/93 |
| 4,261,107 | 4/1981 | Coleman et al. | 33/174 L |
| 4,287,459 | 9/1981 | Dahlstrom | 395/88 |
| 4,362,977 | 12/1982 | Evans et al. | 395/92 |
| 4,456,961 | 6/1984 | Price et al. | 364/513 |
| 4,531,192 | 7/1985 | Cook | 395/93 |
| 4,575,802 | 3/1986 | Walsh et al. | 395/86 |
| 4,578,764 | 3/1986 | Hutchins et al. | 364/513 |
| 4,586,151 | 4/1986 | Buote | 364/513 |
| 4,680,519 | 7/1987 | Chand et al. | 318/568 |
| 4,689,755 | 8/1987 | Buote | 364/513 |
| 4,700,118 | 10/1987 | Kishi et al. | 395/86 |
| 4,727,494 | 2/1988 | Buote | 364/513 |
| 4,757,459 | 7/1988 | Lauchnor et al. | 364/513 |
| 4,761,745 | 8/1988 | Kodaira | 364/513 |
| 4,804,897 | 2/1989 | Gordon et al. | 318/568 |
| 4,809,425 | 3/1989 | Monforte | 29/568 |
| 4,817,017 | 3/1989 | Kato | 395/89 |
| 4,825,394 | 4/1989 | Beamish et al. | 364/571.01 |
| 4,831,232 | 5/1989 | Anderson et al. | 219/124.34 |
| 4,831,549 | 5/1989 | Red et al. | 364/513 |
| 4,835,711 | 5/1989 | Hutchins et al. | 364/513 |
| 4,843,566 | 6/1989 | Gordon et al. | 364/513 |
| 4,887,016 | 12/1989 | Malick | 318/568.13 |
| 4,894,901 | 1/1990 | Soderberg | 29/428 |
| 4,896,087 | 1/1990 | Onaga et al. | 318/568.2 |
| 4,899,095 | 2/1990 | Kishi et al. | 318/568.16 |
| 4,907,695 | 3/1990 | Gomes et al. | 206/386 |
| 4,907,880 | 3/1990 | Egan | 356/151 |
| 4,910,859 | 3/1990 | Holcomb | 29/564.2 |
| 4,914,363 | 4/1990 | Steizer et al. | 318/568.1 |

*Primary Examiner*—Allen R. MacDonald
*Attorney, Agent, or Firm*—Richard F. Schuette

[57] ABSTRACT

Methods of programming mechanical manipulators are disclosed that permit a mechanical manipulator to be programmed to perform coordinated motions between one or more modules comprised of equipment with which the manipulator will interact by defining an origin point and one or more frame points related to each of the modules relative to the origin point. Each of the modules associated with a frame point is then identified and a module program describing pre-programmed manipulator motions related to each of the modules is accessed. Finally, a sequence of motions between the origin and each of the frame points of the modules is defined. The step of locating frame points can be carried out in several different ways, using a teach pendant or by automatically locating the module frame points using an infrared sensor, electric field sensor, acoustic sensor, or force sensor. Methods of programming a mechanical manipulator to move between an origin point and one or more modules are also disclosed which comprise the steps of creating a programming element representative of each module and its corresponding module program. An origin frame point is again defined and the programming elements are assembled to correspond to one or more modules that represent the desired manipulator motion. Finally, the frame point of each of the selected modules is defined relative to the origin point. The programming elements can be comprised of commands, portions of a computer program or icons that represent the module and module program. In a preferred embodiment, each of the module programs begins and ends with the manipulator at a safe point defined as a point from which the manipulator may move in at least one direction without encountering an obstruction. Methods of controlling a manipulator after it has encountered an obstruction are also disclosed.

19 Claims, 3 Drawing Sheets

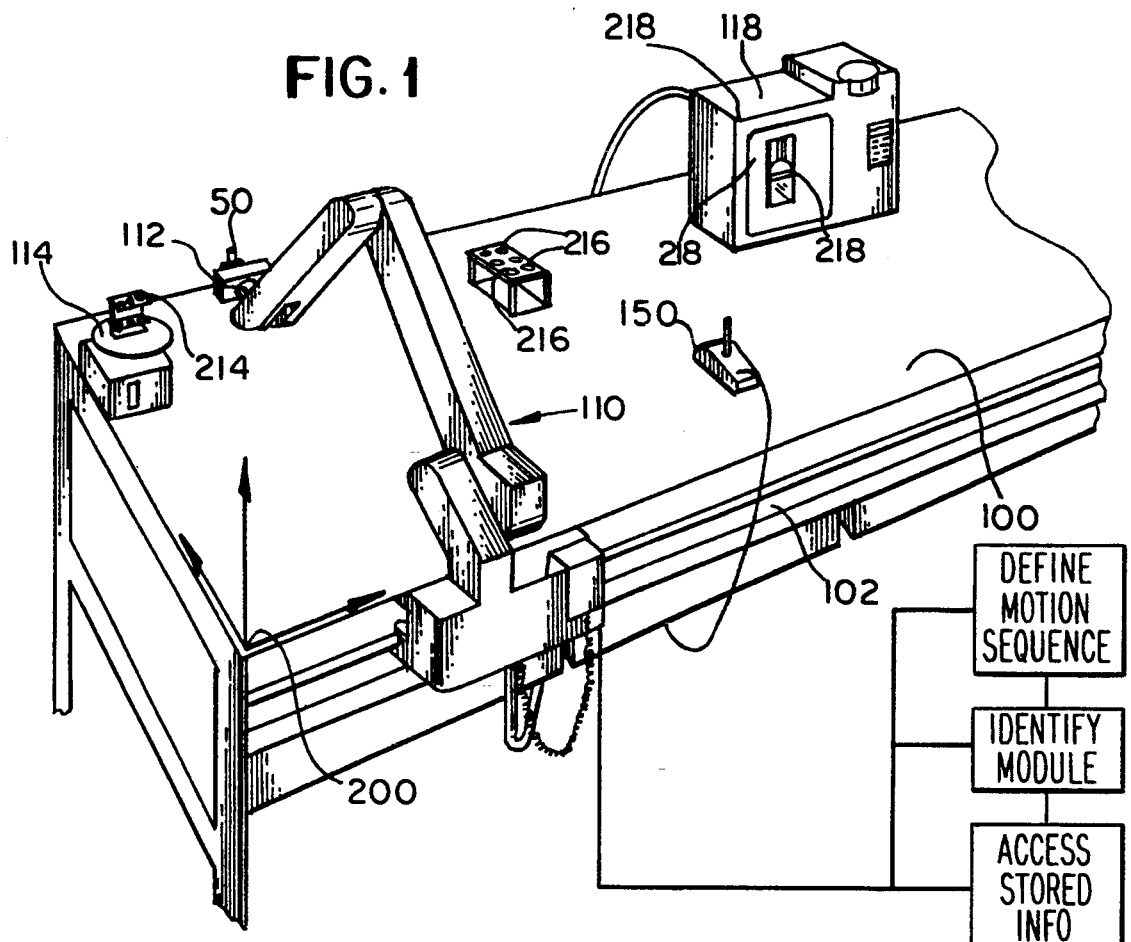
FIG. 1
FIG. 3A
(TEACH MODE)
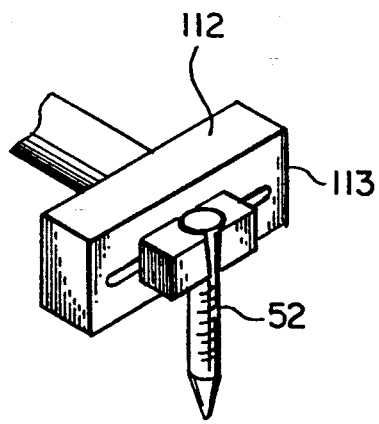
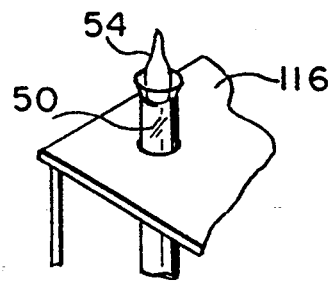
FIG. 2

METHODS FOR AUTOMATICALLY PROGRAMMING SPATIAL INFORMATION IN ROBOTIC SYSTEMS

BACKGROUND OF THE INVENTION

The present invention relates to robotic systems and, more particularly, to methods for programming robotic systems to perform tasks.

The application of robotics to problems outside traditional "assembly line" tasks requires a great deal of programming and flexibility which represents an increasingly important sector of this field. As described in U.S. Pat. No. 4,843,566—Gordon et al., which is assigned to the assignee of the present invention and incorporated herein by reference, robotics, and in particular controlling a mechanical manipulator, requires complex programming that is not usually within the level of skill of the end user. Toward that end, the Gordon et al. patent discloses a motion control system that simplifies programming tasks for a robotic manipulator that, for example, is used to automate a sequence of processing steps in an analytical chemistry laboratory. Robotic manipulator systems such as those described in the Gordon et al. patent and as defined herein operate using stored information to execute a series of steps. Thus, such robotic manipulator systems typically have one or more computing devices and/or microprocessors for receiving instructions and executing programmed steps.

As known to those skilled in the art of robotic manipulator programming, a given motion can be taught relative to a selected point associated with a piece of equipment in order to define the motion in space. One or more further motions are typically associates with each piece of equipment and can be categorized as motions within a "frame." Each frame has an origin, or frame point, from which the points within the frame are defined. Each frame point can then be defined relative to another and, ultimately, to a global or universal origin. For example, if a test tube rack is positioned on a bench relative to a robotic manipulator, a frame made up of coordinates describing the position of each test tube relative to an arbitrary frame point or points on the rack can be defined. The position of these frame points relative to an origin point can also be defined. It is then a simple matter to program the manipulator to load or unload the test tube rack. However, if the rack is moved to another location on the bench, only the new location of the arbitrary frame point on the rack need be defined relative to the origin. The sequence of relative motions within the frame itself has remained unchanged, i.e., the spacing between the test tubes has remained fixed. A description of the above-described programming technique, denominated "stacked user frames," is disclosed in U.S. Pat. No. 4,456,961—Price et al. As disclosed in the Price et al. patent, a manipulator may be moved from point-to-point manually using a teach pendant or by executing programmed commands until the manipulator is in a frame point location.

Another approach to simplifying the programming of a robotic manipulator used in a flexible application environment is disclosed in U.S. Pat. Nos. 4,689,755—Buote and 4,835,711—Hutchins et al. In the system disclosed, physically separable and connectable modules are programmed with certain commands and data. The central processor can then access and initiate a pre-programmed sequence if a particular module is physically "plugged in" to a location. Thus, each module carries its own "intelligence" such that once given an initiation command, it will carry out a certain sequence of steps and interact with the manipulator. As explained in the Hutchins et al. patent, the robot controller derives its instructions directly from the information programmed into each physical "segment" that can be connected to create a system.

However, despite these advances, a need remains to further simplify the programming of robotic systems. As the degree of programming difficulty is lowered, more end users will be able to apply robotics to an increasingly wide array of tasks. It would be desirable, however, to increase the simplicity of robotic manipulator programming without a consonant decrease in the flexibility of the system. Simplification can be achieved simply by grouping certain commands together and renaming them to create a "higher" level programming language. This solution, however creates an inflexible system incapable of alteration without resort to lower level languages inaccessible or incomprehensible to the end user. Accordingly, it is an object of the present invention to provide a system for programming a robotic manipulator that is both simple and flexible.

SUMMARY OF THE INVENTION

The present invention provides methods for programming a mechanical manipulator to perform coordinating motions between an origin point and frame points located on one or more modules comprised of one or more pieces of equipment with which the manipulator will interact, such as an analytical balance, test tube rack or an instrument such as a supercritical fluid extractor. The methods of the present invention preferably comprise defining an origin point and one or more frame points related to each of the modules that are preferably physically located on the modules. These frame points are also defined relative to the origin point. Next, each of the modules is identified and stored information describing pre-programmed manipulator motions related to each of the modules is accessed. Finally, a sequence of motions between the frame points of each of the modules is defined and the accessed information processed to create a program to control the path of the manipulator. In certain embodiments of the present invention, the frame points may be defined by moving the manipulator to the points using a teach pendant. Preferably, special adaptors are inserted into the manipulator and/or the modules to permit the frame points to be precisely aligned using the teach pendant. In other embodiments of the present invention, the frame points can be defined by entering data describing the points directly into a memory device that controls a mechanical manipulator. Alternatively, frame points can be defined by detecting the frame point automatically and recording data describing the location of the frame point. The detection of frame points can be accomplished using many different techniques, including detecting light or other electromagnetic energy or detecting the strength of an electric field that surrounds the frame point. Additionally, the function of automatically detecting the position of a frame point can be accomplished by other means such as acoustic reflectance sensors or by tactile sensors. In certain embodiments, the automatic detection of frame points is accomplished solely by the motion of the manipulator, while in other embodiments the detection of frame points begins only after the manipulator has been moved into the approximate location of the frame point.

The present invention also discloses methods of programming a mechanical manipulator to move between one or more modules comprised of one or more pieces of equipment with which the manipulator will interact. The modules used in accordance with the present invention require a sequence of manipulator movements that are defined by a module program. The location of each module is defined by a module frame point located relative to an origin. In a preferred embodiment, the method of programming comprises the steps of creating programming elements to represent each module and its corresponding module program. A programming element can be a single command, a portion of a computer program, or most preferably an icon that represents the module program. An origin frame point is then defined and in a preferred embodiment, icons are selected to represent the desired modules with which the manipulator will interact. The module frame point of each of the selected modules is then defined relative to the origin to complete the program. Preferably, each of the module programs begins and ends with the manipulator being located at a safe point that is defined as a point from which the manipulator can move in one or more directions without encountering an obstruction. However, in certain embodiments it will not be practical to use this feature; in these instances, the path of the manipulator between each of the module frame points is defined manually.

BRIEF DESCRIPTION OF THE DRAWINGS

FIG. 1 is a perspective view of a robotic manipulator and associated control equipment configured as part of an analytical chemistry laboratory bench.

FIG. 2 is a partial perspective view of a modified gripper and test tube adaptor used in certain embodiments of the present invention.

DETAILED DESCRIPTION OF THE PREFERRED EMBODIMENTS

Figure 3A:
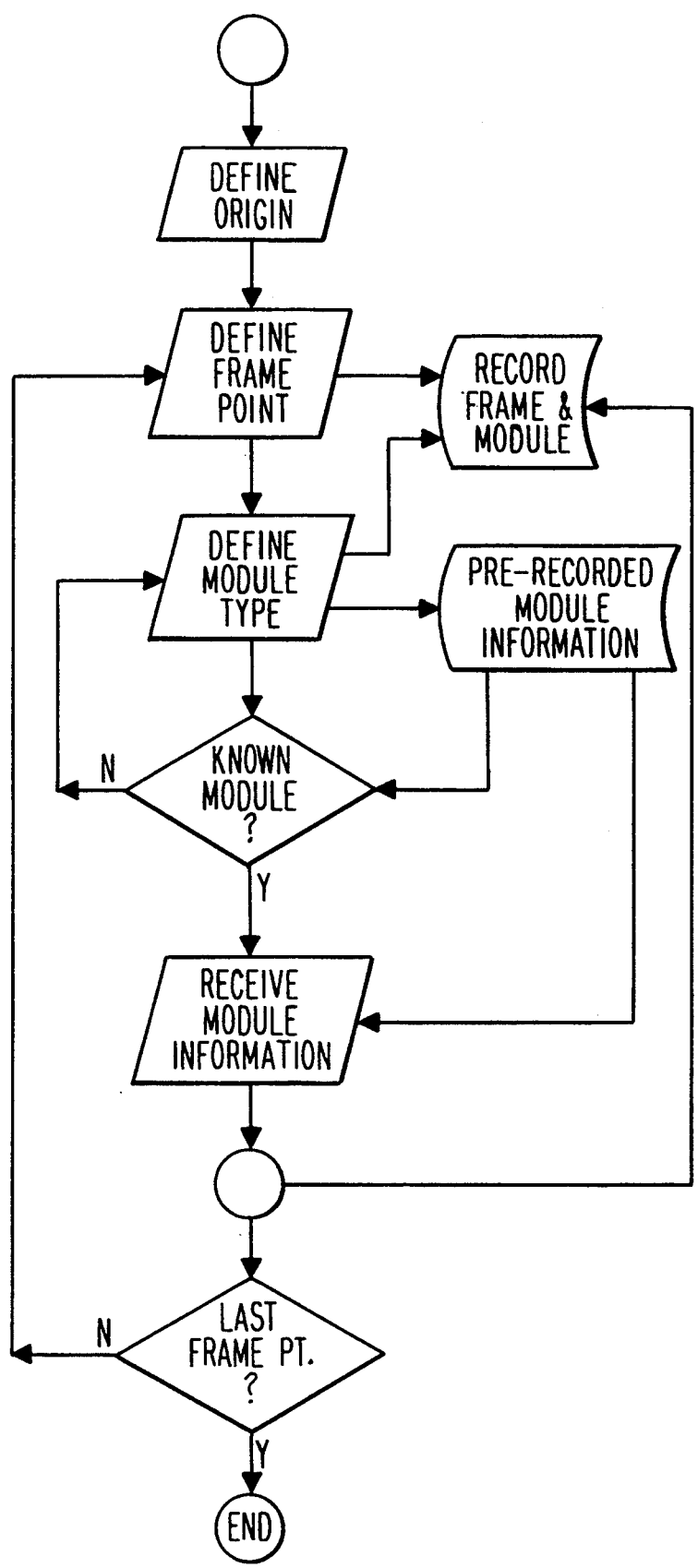
FIGS. 3A–3D are schematic flow chart representations of the methods of the present invention.

Referring to FIG. 1, there is illustrated a perspective view of an automated analytical chemistry bench 100. A track 102 is affixed to the bench 100 to permit a robotic manipulator 110 to travel along its edge. The robotic manipulator 110 is preferably capable of moving at one or more rotational joints or otherwise possesses several degrees of freedom. Additionally, the distal end of the manipulator 110 is preferably terminated by an end effector or gripper 112 that permits the object being manipulated 50 to be effectively grasped. The design considerations relating to the design of robotic manipulators 110 and end effectors or grippers 112 are well known. It should be noted that the present invention can be adapted to be used with nearly any manipulator-/end effector design.

In typical applications of the present invention, the robotic manipulator 110 will interact with one or more "modules" that could include, among other things, a piece of equipment, material or a portion of a device. Each module would be associated with a pre-programmed set of instructions describing a sequence of motions relative to its frame point or points. Thus, a user need only program a module frame point and a module "command" to identify the module. In the example illustrated in FIG. 1, there are three modules spaced along the bench 100: a balance 114, a test tube rack 116 and a super-critical fluid extraction instrument 118. As will be understood by those of ordinary skill, other modules or additional modules can be provided in order to automate actual analytical chemistry procedures and those illustrated are for example only. Thus, for example, as shown in FIG. 3C to empty the test tube rack 116 the frame points for the rack are defined, and the user need only program a descriptive command such as "EMPTY-RACK" which executes the pre-programmed steps associated with the module program whereby the manipulator 110 removes each test tube from the rack 116.

In accordance with the present invention, each module 114, 116, 118 is defined by the location of one or more frame points physically located on or in close proximity to the module. These frame points are defined relative to, for example, an origin 200 at a corner of the bench 100, as illustrated and shown schematically in FIG. 3A. In certain embodiments of the present invention, the robotic manipulator 110 and modules will be mounted on a platform having a precise grid of holes formed therein. One of these holes can be chosen as the origin 200, preferably by locating a pin or other fixture in a particular hole or group of holes. If one of the modules is moved or replaced, the only reprogramming required is the redefining of the new or altered frame points for that module. Positional encoders and calibration techniques well known in the art permit robotic manipulator 110 to measure both absolute and relative locations by determining joint displacements. In manipulators comprising non-rotational joints, other types of encoders are available to permit the determination of manipulator location.

Figure 3B:
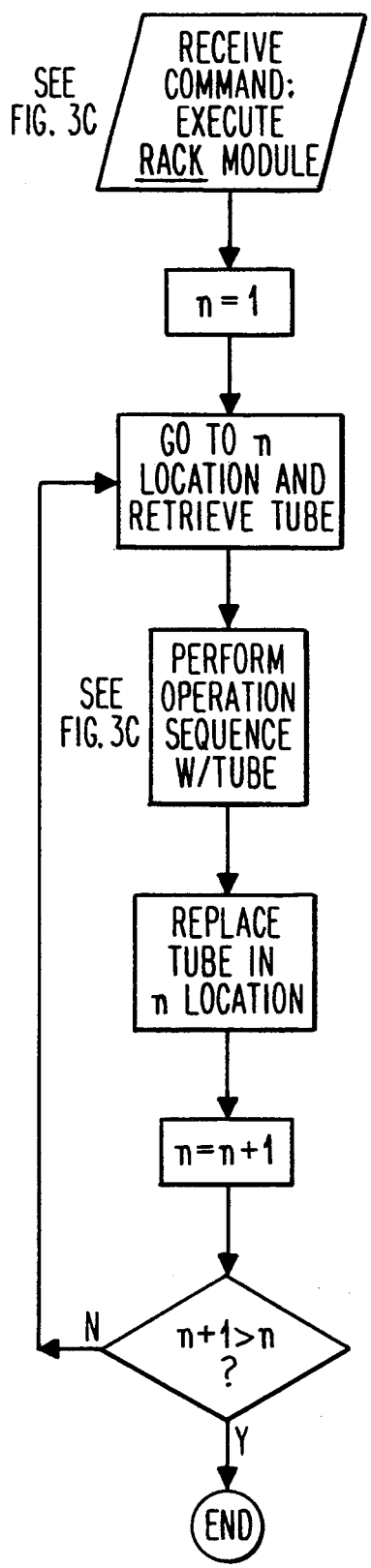

Thus, in the instance of the balance 114 it is preferable to define a single frame point 214 oriented along the central axis of the cylindrical well that receives a test tube 50. However, in the instance of an instrument such as the super-critical fluid extractor 118 or the test tube rack 116, it is preferable to define three or more points 218, 216 to define reference frame planes. The use of multiple frame points is important when access to the module or motion within a module is relative to one or more planes such that alignment problems could arise. In the case of the super-critical fluid extractor 118, a sample vial (not illustrated) must be inserted through an access panel 119 and then moved downwardly into a receiving port (not visible). Although the frame points can be arbitrary in some instances, it will be preferred to define frame points using preselected points that have been chosen or designed as a part of the equipment associated with a module. Finally, in certain instances it may be necessary to define more than one frame for a single module. Regardless of the configuration of a particular module or the number of frame points defined, so long as the relative distance between the origin 200 and the frame points is precisely defined, the necessary sequence of steps to be carried out within can be recalled from memory, (as seen in FIGS. 3A–3C) without further programming.

Figure 3C:
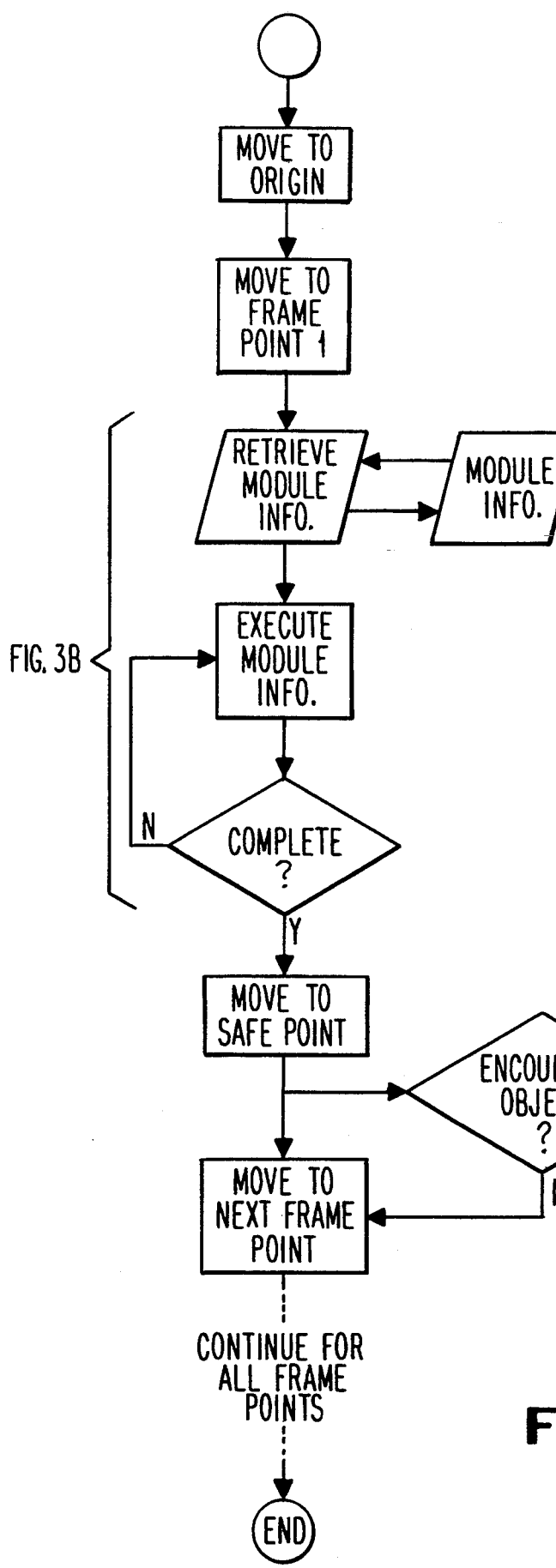

Frame points can be defined in a number of ways, all of which can be represented schematically by FIG. 3C. Typically, robotic manipulators can be controlled through a teach pendant 150, such as that described in U.S. Pat. No. 4,804,897—Gordon et al. which is assigned to the assignee of the present invention and incorporated by reference as if fully reproduced herein. The use of a teach pendant permits the various joints of the manipulator 110 to be actuated and moved to the location of the frame points. However, the accuracy required for many movements cannot be accomplished by holding the actual object to be moved in the gripper and moving it to a point of insertion or removal. Therefore, as illustrated in FIG. 2, in certain embodiments of the present invention specially adapted grippers 112, objects to be gripped or fixtures may be provided to facilitate defining frame points using a teach pendant. In the case of a gripper 112, the gripper jaws 113 may be extended and brought to a point in order to physically define the central axis of the jaw opening. In other instances, as illustrated in FIG. 2, it may be desirable to use conventional grippers but to place a specially adapted object in their grasp, e.g., a special fixture having a conical stylus 52 the size of a test tube 50 but with a pointed tip to define its centerline. In certain embodiments other specially adapted objects may be inserted into a module, e.g., a rack location and the gripper placed over or on it such as the special conical test tube cap 54 illustrated in FIG. 2. In the latter case, it may also be desirable to use such a specialized fixture in conjunction with a specialized gripper, as described above, in order to precisely physically locate a frame point.

The programming techniques of the present invention described above also permit the frame points to be automatically "taught" to the robotic manipulator system. In this aspect of the present invention, the robotic manipulator "homes in" on a frame point and precisely determines its location automatically. As will be understood by those of ordinary skill, such a system will involve at least one active sensor to provide feedback to the robotic manipulator. For example, a reflective indicator could be placed at each frame point and sensed by an appropriate emitter/detector, e.g., a photoelectric cell. Thus, the user would move the robotic manipulator to a position close to the frame point and then activate a "self-frame" mode to allow the frame point to be precisely located automatically. In some instances, the self-frame mode could be fully automatic, with the sensor scanning the entire work envelope for frame points, and then homing in and recording them. Another technique that can be used for self-framing is to provide an electrical field sensor and source. This technique has the advantage of permitting the robotic manipulator to ascertain its proximity to the actual frame point, since the field strength will vary in inverse proportion to distance. Alternatively, acoustical sensors or force sensors can also be used to fulfill this function.

Another beneficial aspect of the present invention is the capability to program "safe points" into the robotic manipulator's path. As the name implies, a safe point is a predetermined position to which the robotic manipulator can return prior to moving in a certain direction that ensures the subsequent manipulator motion will not be interfered with by a module or other structure. A safe point is generally a point from which it has been determined that the robot can move in one or more directions without encountering an obstruction. Thus, in a preferred embodiment of the present invention, each of the programmed motions incorporated into the modules starts and ends at a safe point in the robot work envelope as illustrated in FIG. 3C. The user of the system is therefore able to create a program to carry out a task simply by linking the module safe points together. In a most preferred version of this embodiment, the system software generates images (icons) representative of each of the modules that are linked together, and creates an image representative of the assembled modules and the sequence through which the robotic manipulator will move. Since the use of safe points guarantees that the manipulator will not "crash," the need for any lower level programming is eliminated, although such an option remains available to the end user. This embodiment of the present invention incorporates the framing concepts described above and makes full utilization of the programming incorporated into the module frames. In such an embodiment, an end user simply needs to know the correlation between the modules and their icons. The icons are assembled to create a desired pattern of motion, e.g., an analytical chemistry "method" and as a result the manipulator will be "programmed" to undertake these steps. No further knowledge of programming languages or concepts is necessary.

The present invention substantially eliminates the need for the end user to have to program motions within those modules that have defined frame points. This feature in turn reduces the number of programming errors introduced by the end user, since the programming within the modules is performed by the manufacturer or vendor. An important benefit of the present invention, however, is that the program development time for a particular application is substantially reduced, permitting the end user to experiment and expand the usefulness of the robotic systems described herein.

Figure 3D:
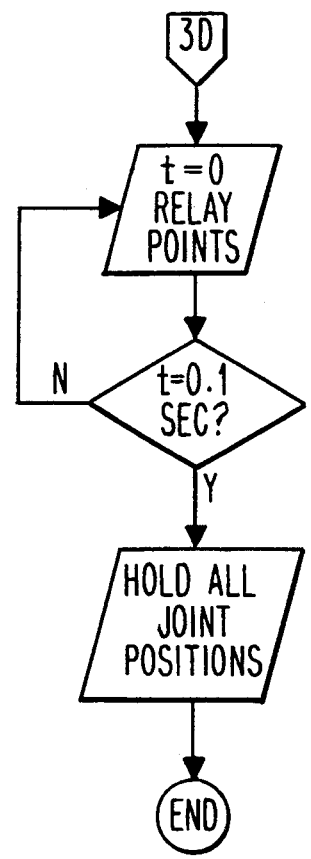

The present invention also permits the robotic manipulator to recognize when it encounters an obstruction and provide a safe recovery from this situation. Previously, commands were issued that shut off the power to the manipulator if it was impeded in any way. This, however, could cause a hazard if the manipulator was carrying some dangerous material that was allowed to fall due to the power loss. One way to solve this problem would be to use a mechanical fail-safe brake which holds the robot in place during such a power loss. This solution, however, would be both unwieldy and expensive for the class of robots to which the present invention is applied. Thus, in another aspect of the present invention, it has now been found that it is possible to sense an error condition and instead of immediately shutting off power to the manipulator, a command is issued to relax the manipulator joints for about one tenth of a second, and then hold itself in place. A schematic of this system is shown in FIG. 3D. This sequence removes any pressure exerted by the manipulator, and at the same time allows it to maintain its hold on any sample it was carrying.

In a preferred embodiment as shown in FIG. 3D, when the manipulator hits an obstruction an error is reported to the controller. The controller automatically sends a command to the servos to stop the movement toward original destination and to treat the current position as the final destination. This command causes the manipulator joints to relax momentarily and then the servos move to the current position, which is then reported to the controller as the current position of the manipulator. The manipulator is still functional at this point but has provided a safe recovery. This action is then reported to the host computer in order to notify the user of this situation.

The modular programming of the present invention described immediately above therefore permits safe points to be defined and most preferably moves the manipulator between safe points. However, as explained above, in those instances where the manipulator strikes an object, whether through programming error or outside intervention, the safe error recovery feature will substantially eliminate catastrophes associated with such error.

Although certain embodiments of the present invention have been set forth and discussed above with particularity, these embodiments are meant to exemplify the present invention and not to limit its breadth. Those of ordinary skill will undoubtedly realize numerous modifications and adaptations of the concepts described above are possible. For example, the framing techniques described herein are well suited for a number of applications outside the field of analytical chemistry. Thus, in order to determine the full scope of the present invention, the appended claims must be reviewed.

We claim:

1. A method for programming a mechanical manipulator to perform coordinated motions between one or more modules comprised of one or more pieces of equipment with which the manipulator will interact, the method comprising:

defining an origin point;

defining one or more frame points associated with each of said modules relative to the origin point by moving the manipulator until it is in registration with a fixture portion of a module that identifies a frame point;

entering information identifying each of said modules;

accessing stored information describing pre-programmed manipulator motions related to each of the modules; and defining a sequence of motions between the origin point and each of the frame points associated with said modules and using the stored information accessed to execute a pre-defined series of motions related to said module;

detecting contract between the mechanical manipulator and an obstruction, and when contact is detected;

relaxing the mechanical manipulator; and defining the relaxed position as a final destination.

2. A method for programming a mechanical manipulator to perform coordinated motions between one or more modules comprised of: one or more pieces of equipment with which the manipulator will interact the method comprising:

defining an origin point;

defining one or more frame points associated with each of said modules relative to the origin point by moving the manipulator using a teach pendant until it is in registration with at least one fixture apparatus inserted into a module that identifies a frame point;

entering information identifying each of said modules;

accessing stored information describing pre-programmed manipulator motions related to each of the modules; and defining a sequence of motions between the origin point and each of the frame points associated with said modules and using the stored information accessed to execute a pre-defined series of motions related to said module.

3. The method of claim 1 wherein at least one of the frame points is defined by moving the manipulator to the frame points using a teach pendant.

4. The method of claim 3 further comprising the steps of inserting an adaptor into the mechanical manipulator that precisely defines a manipulator end point and moving the manipulator until the manipulator end point is in registration with a frame point.

5. The method of claim 2, wherein at least one of the frame points are defined by entering data describing said points into a memory device that controls the mechanical manipulator.

6. The method of claim 2, wherein the step of defining the frame points comprises detecting a frame point and recording data describing the location of the frame point in a memory device that controls the mechanical manipulator.

7. The method of claim 6, wherein the step of detecting a frame point comprises emitting and receiving electromagnetic energy.

8. The method of claim 6, wherein the step of detecting a frame point comprises detecting the strength of an electric field surrounding the frame point.

9. The method of claim 6, wherein the step of detecting a frame point comprises emitting and receiving acoustic energy.

10. The method of claim 6, wherein the step of detecting a frame point comprises sensing a force.

11. The method of claim 6, wherein the step of detecting the frame point is preceded by the step of moving the manipulator into the approximate location of the frame point.

12. A method of programming a mechanical manipulator to move between an origin point and one or more modules comprising equipment with which the manipulator will interact, the modules requiring a sequence of manipulator movements contained in a module program that are defined relative to a module frame point, the method comprising the steps of:

creating a programming element representative of each module to identify each module and its corresponding module program;

defining an origin frame point;

assembling the programming elements one or more selected modules to represent a programmed manipulator motion; and defining the frame point of each of said selected modules relative to the origin frame point.

13. The method of claim 12, wherein the programming elements comprise at least a portion of a computer program.

14. The method of claim 12, wherein the programming elements comprise one or more commands in a programming language.

15. The method of claim 12, wherein the programming elements comprise icons that represent the module and access the module program.

16. The method of claim 12, wherein the module programs begin and end at a safe point defining a position from which the manipulator may move in one or more predetermined directions without encountering an obstruction.

17. The method of claim 12, further comprising the steps of defining the path of the manipulator between the first point and each of the module frame points.

18. A method for programming a mechanical manipulator to perform coordinated motions between one or more modules comprised of one or more pieces of equipment with which the manipulator will interact, the method comprising:

defining an origin point;

defining one or more frame points related to each of said modules relative to the origin point;

identifying each of said modules;

accessing stored information describing pre-programmed manipulator motions related to each of the modules and the defined frame points; and defining a sequence of motions between the origin point and each of the frame points of said modules and using the stored information accessed, wherein upon moving the manipulator between the origin point and each of the frame points upon detecting contact between the mechanical manipulator and an obstruction the method of programming comprises the further steps of;

relaxing the mechanical manipulator; and defining the relaxed position as a final destination.

19. A method for programming a mechanical manipulator to perform coordinated motions between one or more modules comprised of one or more pieces of equipment with which the manipulator will interact, the method comprising:

defining the origin point;

defining one or more frame points related to each of said modules relative to the origin point by inserting a fixture into a module to precisely define a frame point and moving the manipulator until it is in registration with the precisely defined frame point, wherein at least one of the frame points is defined by moving the manipulator to the frame point using a teach pendant;

identifying each of said modules;

accessing stored information describing pre-programmed manipulator motions related to each of the modules and the defined frame points; and defining a sequence of motions between the origin point and each of the frame points of said modules and using the stored information accessed.

* * * * *